United States Patent [19]

Regen

[11] Patent Number: 4,560,599
[45] Date of Patent: Dec. 24, 1985

[54] ASSEMBLING MULTILAYERS OF POLYMERIZABLE SURFACTANT ON A SURFACE OF A SOLID MATERIAL

[75] Inventor: Steven L. Regen, Milwaukee, Wis.

[73] Assignee: Marquette University, Milwaukee, Wis.

[21] Appl. No.: 695,483

[22] Filed: Jan. 28, 1985

Related U.S. Application Data

[63] Continuation-in-part of Ser. No. 579,386, Feb. 13, 1984, abandoned.

[51] Int. Cl.$^4$ ............................................. B05D 3/06
[52] U.S. Cl. ..................................... 428/36; 260/403; 260/925; 260/952; 427/44; 427/54.1; 427/407.1; 427/412.3; 428/409; 428/520; 526/277; 526/285; 526/310; 526/311
[58] Field of Search ....................... 427/38, 39, 40, 41, 427/44, 54.1, 402, 407.1, 412.3; 526/277, 285, 310, 311; 260/403, 404, 925, 952; 428/409, 520, 441, 442, 36

[56] References Cited

U.S. PATENT DOCUMENTS

| | | | |
|---|---|---|---|
| Re. 30,748 | 9/1981 | Sears | 260/403 |
| 2,002,885 | 5/1935 | Detwiler et al. | 260/403 |
| 2,531,275 | 11/1950 | Jones | 260/408 |
| 2,599,549 | 6/1952 | Fisher et al. | 560/185 |
| 2,689,863 | 9/1954 | Broderick et al. | 260/549 |
| 3,326,958 | 6/1967 | Curtius et al. | 260/546 |
| 3,780,092 | 12/1973 | Samour et al. | 526/311 |
| 4,012,353 | 3/1977 | Chasin et al. | 526/277 |
| 4,116,787 | 9/1978 | Gatechair | 526/311 |
| 4,154,887 | 5/1979 | Morshauser et al. | 427/402 |
| 4,251,565 | 2/1981 | Bowen | 427/407.1 |
| 4,254,115 | 3/1981 | Davidson et al. | 260/403 |
| 4,320,121 | 3/1982 | Sears | 260/403 |
| 4,438,151 | 3/1984 | Yamaguchi et al. | 427/402 |
| 4,452,957 | 6/1984 | Neigel | 526/277 |

FOREIGN PATENT DOCUMENTS

| | | | |
|---|---|---|---|
| 47907 | 7/1979 | European Pat. Off. | 427/54.1 |
| 2455231 | 5/1975 | Fed. Rep. of Germany | 427/39 |
| 50-36510 | 4/1975 | Japan | 427/41 |
| 1447000 | 8/1976 | United Kingdom . | |

*Primary Examiner*—John H. Newsome
*Attorney, Agent, or Firm*—Scully, Scott, Murphy & Presser

[57] ABSTRACT

A method for the direct stepwise coating of a solid substrate with a polyfunctional polymerizable surfactant to provide a multilayer assembly of a plurality of oriented monolayers of polymerized surfactant on a surface of the solid substrate comprising depositing and polymerizing sequential layers of polymerizable surfactant on the substrate from a polymerization system comprising:

(a) a polyfunctional polymerizable surfactant in an aqueous or other polar solvent system; and
(b) a polyfunctional polymerizable surfactant in a non-polar organic solvent system and wherein the sequential coatings are alternately effected from the (a) and (b) polymerization systems and the polymerizable surfactant utilized is the same or different for each sequential coating, and multilayered surfactant coated solid substrate products produced by this method.

76 Claims, No Drawings

ASSEMBLING MULTILAYERS OF POLYMERIZABLE SURFACTANT ON A SURFACE OF A SOLID MATERIAL

CROSS REFERENCE TO RELATED PATENT APPLICATIONS

This patent application is a continuation-in-part of U.S. patent application Ser. No. 579,386 filed Feb. 13, 1984 abandoned in the name of Steven L. Regen.

BACKGROUND OF THE INVENTION

The present invention is directed to modifying the surfaces of solid materials and, more particularly, to methods of assembling multiple polymeric layers (multilayers) of polymerizable surfactant directly on the surface of solid materials.

Surface structure and composition play a significant role in defining many of the physical properties and ultimate uses of solid materials. In particular, features such as wetting, weathering, adhesion, dye adsorption, friction, electrostatic charging, permeation, and biocompatibility are largely influenced by surface characteristics. The alteration of surface characteristics can, therefore, be significant for engineering and biotechnological applications. The methods which are currently available, however, for modifying, in a well-defined manner, solid surfaces, and especially for modifying polymer surfaces, remain limited.

It is, therefore, desirable to provide alternative means of modifying the surface characteristics of solids, particularly those having configurations which are difficult, if not impossible, to coat by conventional processes. Particularly, it would be desirable to provide a method for assembling polymerized multilayers of polymerizable materials directly onto the surfaces of solid substrates having complex configurations. Various conventional methods exist for assembling multilayers such as those disclosed in the following literature references, Blodgett, K. B., *J. Am. Chem. Soc.*, 1935, Vol. 57, page 1007, Blodgett, K. B. Langmuir, I., *Phys. Rev.*, 1937, Vol. 51, page 964; Gaines, G. L., Jr., *Thin Solid Films*, 1980, Vol. 68, page 1; Honig, E. P. I., *J. Colloid Interface Sci.*, 1973, Vol. 43, page 66; Kopp, F., Fringeli, U. P., Muhlethaler, K., Gunthard, H., *Biophys. Struct. Mech.*, 1975, Vol. 1, page 75; and Sagiv. J. and Netzer, L., *J. Am. Chem. Soc.*, 1983, Vol. 105, page 674; which show various methods and materials for modifying solid surfaces. The methods disclosed in these references have certain limitations especially when applied in large scale operations, and/or when applied to substrates having complex configurations.

The need exists, therefore, for new methods for modifying solid surfaces, and especially organic polymer surfaces, and more particularly surfaces having complex configurations. Particularly promising materials for modifying the surfaces of solid materials are polymerizable surfactants. Some polymerizable surfactants are disclosed in copending patent applications of the present inventor, i.e., Ser. No. 280,633, filed July 6, 1981 and now abandoned; Ser. No. 382,296, filed May 26, 1982; and Ser. No. 618,634 filed June 8, 1984. Ser. No. 382,296 is a continuation-in-part application of Ser. No. 280,633 and Ser. No. 618,634 is a division of Ser. No. 382,296. These applications disclose a class of synthetic phosphatidyl derivatives which can form vesicles by being polymerized in situ. Particularly, these applications disclose the use of synthetic phosphatidyl-cholines for such purposes. The phosphatidylcholine compounds disclosed therein can be used to modify the surfaces of solid organic polymers such as polyethylene by polymerization on the surface thereof. Application Ser. Nos. 382,296 and 618,634 disclose forming a monolayer of polymer (lipid) on a surface of a hydrophobic olefinic polymer. Useful lipids include the phosphatidylcholine compounds disclosed therein as well as amphiphylic lipids having an olefinic polymerizable substituent. A large number of amphiphylic lipids having an olefinic polymerizable substituent are described in the paper of Hub, et al., *Angewandte Chemie*, (English edition) Vol. 19, (1981), page 938; and in "Polymerization of Organized Surfactant Assemblies," J. H. Fender, in "Surfactants in Solution," Edited by K. L. Mittal and B. Lindham, Plenum Press. New York, 1984, pages 1947 to 1989;

"Polymerized Surfactant Aggregates: Characterization and Utilization," J. H. Fendler and P. Tundo, *Accounts Chem. Res.*, Volume 17, Pages 3 to 8, (1984); and "Polymerized Surfactant Vesicles—Novel Membrane Mimetic Systems, Science, Volume 223, pages 888 to 894, (1984).

The entire disclosures of patent application Ser. Nos. 280,633, 382,296 and 618,634, and all the above-referenced publications are incorporated herein by reference and made a part of this specification.

The need exists, therefore, to develop methods for assembling multilayers of polymerizable surfactants on surfaces of solid substrates, particularly surfaces of solid organic polymers, and most particularly such surfaces as are present in articles having complex configurations, in order to modify the surface characteristics of these materials.

SUMMARY OF THE INVENTION

It is an object of the present invention, therefore, to provide a method for assembling polymerized mutilayers of polymerized surfactant directly on the surface of a solid substrate to modify, as desired, the surface characteristics of the substrate.

It is further object of the present invention to provide a process for assembling multilayers of surface modifiers on a solid substrate by chemical means adaptable to relatively large scale operations.

It is a further object of the invention to provide multilayered polymerized surfactant coated solid materials with modified surface characteristics.

Another object of the present invention is to provide a process for coating the surfaces of objects having irregular or complex configurations.

Another object of the present invention is to provide novel coated objects made by the process of the present invention.

It is a further object of the invention to provide articles having multilayer assemblies formed from a plurality of polymerized oriented monolayers of polymerizable surfactant.

To achieve the objects in accordance with the purposes of the invention, as embodied and broadly described herein, the invention comprises a method for the stepwise coating of a solid substrate with a polyfunctional polymerizable surfactant to provide a multilayer assembly on the surface of the solid substrate comprising depositing and polymerizing sequential layers of polymerizable surfactant directly on the substrate or coated substrate from two separate polymerization systems which are
- (a) a polyfunctional polymerizable surfactant in an aqueous or other polar solvent system, and
- (b) a polyfunctional polymerizable surfactant in a non-polar organic solvent system,
  - and wherein the sequential coatings are alternately effected from such (a) and (b) polymerization systems,
  - and wherein the polymerizable surfactant utilized is the same or different for each sequential coating. In preferred embodiments, the polymerizing step is effected by irradiation. The aqueous or other polar solvent of such polymerization system (a) need not be removed prior to polymerization, and is usually present during the polymerization step. The non-polar organic solvent of such polymerization system (b) is usually removed prior to the polymerization step, but need not be.

The invention also comprises the mutilayered surfactant coated solid substrates produced by the method of the invention.

DETAILED DESCRIPTION OF THE PREFERRED EMBODIMENTS

Reference will now be made in detail to the present preferred embodiments of the method of the invention and the products produced thereby.

The invention provides a method for assembling polymerized multilayers of polymerizable surfactant on a surface of a solid material. The solid materials contemplated by the invention include, but are not limited to, organic polymers, glass, silanated glass, graphite, and metals. Particularly preferred materials include $C_2$ to $C_8$ olefin homopolymers and copolymers and, more particularly, homopolymers such as polyethylene, polypropylene, polybutylene and polystyrene and copolymers such as copolymers of ethylene and one or more $C_3$ to $C_8$ olefins, and mixtures of such polymers.

The term silanated glass means glass that has had its surface treated with a silicon compound such as a silicone, a silicon ether or ester or a silylating agent.

The solid substrates may be either hydrophobic or hydrophilic. They may have simple planar surfaces such as film, continuous film, block or strip form. The substrates may also have highly irregular or complex shaped surfaces which are not readily, if at all, coatable by the prior art processes. The configurations of substrates that may be completely coated, for example, by the well known Langmuir-Blodgett prior art process are very limited, and will not include articles having one or more isolated surfaces. Such isolated surfaces will not be coated when employing the Langmuir Blodgett Process. An isolated surfaced object, therefore, for the purpose of the present invention is one having a configuration such that, when lowered, at any angle or orientation, into a Langmuir-Blodgett coating bath, the object has one or more surfaces which become, and remain, isolated from the surface pressure maintained by the coating film balance in the coating bath. Various types of isolated surfaced objects, therefore, are not coatable by the Langmuir-Blodgett process, such as, tubing, porous materials, woven and non woven constructions and rough surfaced articles.

A rough surfaced article is one which has a projected surface area that is a fraction, i.e., a 1/10 to ½, of the actual surface area as determined, for example, by surface adsorption studies.

Other types of articles that are difficult or impossible to coat in the Langmuir-Blodgett process are fine, particulate sized materials, whether porous or not, that would have a particle size of the order of about 100 microns or less.

When coating surfaces with surfactant in the Langmuir-Blodgett process the surfactant layer is not directly applied to the surface being coated. In the Langmuir-Blodgett process the surfactant layer is floated or transferred to the substrate being coated; and the surfactant layer to be transferred is established at an interface of, say, air and water or air and mercury. When an air/water interface is used in the Langmuir Blodgett Process the interface tension is 72.75 dynes/cm at 20° C., where the surface tension of air is zero dynes/cm. When an air/mercury interface is used in the Langmuir Blodgett process the interface tension is 435.5 dynes/cm.

When using the process of the present invention, on the other hand, the substrate being coated with the surfactant is coated directly on the surfaces thereof by application thereto of a bulk solution of the surfactant being used, as by having the substrate immersed in a bulk solution of the surfactant, and the surfactant forms a coating directly on the surface of the substrate being coated. Thus, since a specific interfacial system, such as air/water, is not needed for the process of the present invention, the present invention allows for a much wider selection of interfacial tensions based on the surface tensions of the substrate (itself) being coated, and the medium (surfactant solution) in which the substrate is to be modified by coating.

The shaped articles that may be coated in the process of the present invention, and which are not coatable in the Langmuir-Blodgett process, may also be described as having no retrosurfaces, that is they have a non-air occluding topography. Such articles or objects have one or more surfaces which are not coatable by the mechanical pressurized transfer of coating which is used in the Langmuir-Blodgett process. This mechanical pressurized transfer process requires the use of an air/water interface or at interface of air and another suitable liquid, such as mercury, at the precise location of the substrate surface which is to be coated.

Another type of substrate which can be coated in accordance with the invention is a planar material such as a solid organic polymer film which can have hydrophobic or hydrophilic surface characteristics. Such planar substrates would include organic polymer film in strip form or formed in a continuous manner. A continuous film is particularly adaptable for continuous assembly of polymerized surfactant layers thereon by running the film through an assembly line of steps for applying such polymerized surfactant layers as will be described herein.

When the coatings of polymerized surfactant are applied to the surface of the object being coated therewith, they may be applied so as to entirely coat the surfaces being coated, or the coatings may be used to form patterns on such surfaces such as in the form of a photoresist pattern, or a gridiron pattern, or a pattern of discontinuous symbols or figures such as dots, or other configurations in which less than the whole surface of the substrate is covered.

In order to effect such patterns on the surface of the object being coated suitably patterned photo masks may be used to block off from actinic radiation the areas which are to be coated.

The coatings of the present invention may also be applied to the substrate so as to provide coatings of different "heights" or thicknesses on different portions of the substrate. This may also be achieved by the use of masking means, i.e., after a coating of a given thickness is applied to a substrate, a portion of such first coating may be masked and the exposed remainder of the first coating can then be further coated with one or more additional coatings with or without the use of additional masks, at the higher coating levels, to optionally achieve additional patterns of coating heights or thicknesses in the subsequent coating levels.

A variation in this concept of providing coatings of different thicknesses, is to provide a series of stepped-up coatings, wherein each successive coating is superimposed on a portion, but not all, of the next lower coating, so that each upper level of coating is set back from the edge of the next lower coating.

Each layer of coating that is applied in accordance with the process of the present invention is about 20 to 50, and preferably about 30 to 40, Angstroms in thickness.

Types of planar or complex surfaced articles on which the patterned coatings of the present invention may be advantageously applied would include substrates employing photoresists, non-linear optical elements for the purpose of fabricating optical devices such as switches, wave mixers and logical gates.

The surfaces of the solid materials when modified as disclosed above can have altered characteristics in terms of features such as wetting, weathering, adhesion, dye adsorption, friction, electrostatic charging, permeation and biocompatibility.

Suitable polymerizable surfactants include many conventional amphiphylic lipids having an olefinic polymerizable substituent such as those molecules described in the publications referred to above and which has been incorporated into this specification by rference, the phosphatidylcholines disclosed in the U.S. patent applications which have also been incorporated herein by reference, namely, Ser. Nos. 280,633, 382,296 and 618,634 as well as any other polymerizable surfactants which are compatible with the method of the invention as would be known to those skilled in the art.

Polymerizable surfactant is defined, for the purposes of the present invention, as an amphiphathic molecule, that is, one having a hydrophilic portion and a hydrophobic portion, and the molecule also contains one or more polymerizable groups.

Preferred polymerizable surfactants in accordance with the methods of the invention are those containing two or more polymerizable groups within the molecule and will be defined for the purposes of the present invention and the appended claims as polyfunctional polymerizable surfactants. Surfactants containing only a single polymerizable group within the molecule (monofunctional) have, in limited experimentation, been found ineffective for modifying surfaces of low density polyethylene under the conditions employed for the present invention, e.g., the monofunctional phospholipid (A) and the monofunctional ammonium phosphate (B).

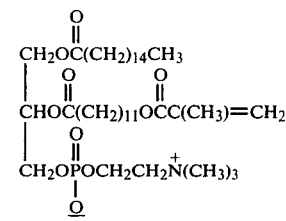

(A)

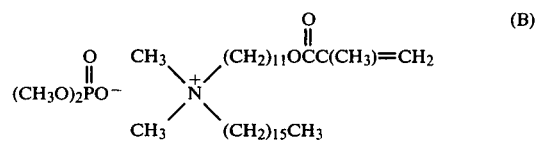

(B)

Particularly preferred polyfunctional polymerizable surfactants are those wherein at least two of the polymerizable groups are present in separate acid molecules of the lipid. These particularly preferred surfactants include phosphatidylcholines and, particularly, phosphatidyl cholines of the following structures:

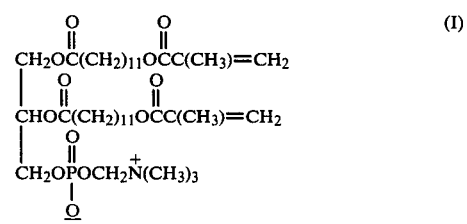

(I)

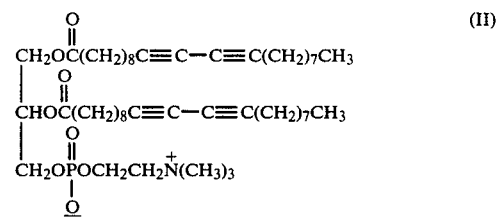

(II)

Also preferred are phosphate esters and ammonium phosphates and particularly a novel phosphate ester of the following structure:

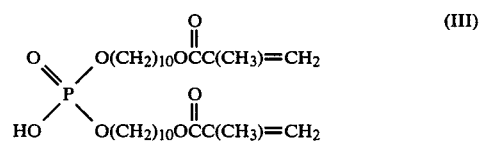

(III)

and a novel ammonium phosphate of the following structure:

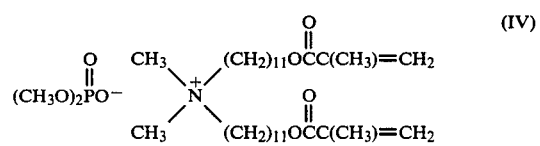

(IV)

In accordance with preferred embodiments of the invention, multilayers of polymerizable surfactant are assembled directly on the surface of a solid substrate by sequential deposition polymerization. The initial step is depositing a polyfunctional polymerizable surfactant on a surface of a solid substrate to form a coating of surfactant thereon. The polymerizable surfactant is deposited on the surface of the solid substrate in a polar solvent, preferably an aqueous solution, or in any suitable solvent which is evaporated from the surface to leave only the polymerizable surfactant on the surface.

The deposition of each coating of surfactant from its respective solvent system can be achieved by spontaneous deposition, as by immersing the substrate to be coated into a solution of the surfactant, or by treating the surface of the substrate with an aerosol formulation of the surfactant in its solvent, as by spraying the aerosol formulation on the substrate surface.

After polymerization of the first layer of surfactant a further layer of polyfunctional polymerizable surfactant in a non-polar solvent system is deposited directly on a substrate or on a previously coated substrate. Generally, the non-polar solvent system is substantially non-polar and aprotic but may contain minor amounts of polar and/or protic components.

Each coating of surfactant material on the surface of the solid material is polymerized to form an oriented mono-layer of polymerized surfactant on the surface of the substrate. The polymerization can be accomplished by either applying irradiation to the coating or by chemical means, preferably by utilizing a free radical initiator, to effect the polymerization. Suitable free radical initiators include peroxides an aliphatic azo compounds such as those described in Kirk-Othmer, *Encylopedia of Chemical Technology*, Vol. 13, "Initiators", pp. 355-371, 3rd ed., 1981, the entire disclosure of which is incorporated herein by reference.

Suitable non-polar solvents include conventional hydrocarbon solvents known to those skilled in the art. The non-polar solvent can be used in admixture with minor amounts of a polar solvent which is present in amounts to enhance the solubility of the polymerizable surfactant therein. Preferably, the non-polar solvent is a mixture of a major amount of n-hexadecane and a minor amount of a chloroform, preferably in a ratio of n-hexadecane to chloroform of about 100:1.

In preferred embodiments depositing a polymerizable surfactant in a polar solvent on a substrate with hydrophobic surface characteristics alters the surface characteristics of the substrate so as to render such surface hydrophilic and, conversely, depositing polymerizable surfactant in a non-polar solvent on a substrate which is a hydrophilic or has been coated with a polymerized surfactant to render the substrate hydrophilic alters the surface characteristics of the substrate so as to render such surface hydrophobic.

In preferred embodiments of the method of the invention, if the substrate surface to be coated is a hydrophobic solid material, then the polymerizable surfactant is deposited in the absence of a non-polar solvent. If the surface of the solid material is hydrophilic or the surface already has an initial coating of polymerizable surfactant thereon which has been applied in the absence of a non-polar solvent to render the surface hydrophilic, then the polymerizable surfactant is deposited on the surface in a non-polar solvent.

The methods and procedures of the invention permit modification and alteration of characteristics of the substrate surfaces or layers thereon to either change the inherent nature of the surface, such as by changing a hydrophobic surface to a hydrophilic one, or by altering the degree of hydrophilicity or hydrophobicity of a surface.

As noted above, layers of polymerized surfactant may be assembled on one or more, but less than all, of the the surfaces of the substrate, all surfaces of the substrate, and/or on one or more partial surfaces of the substrate as is desired for the intended application of such modified substrate.

The number of layers of polymerized surfactant which may be assembled upon the substrate is generally not limited to any particular number and assembly of up to five or six layers is practical. The number of layers which may be applied to the substrate depends upon the reaction conditions and parameters as well as the type of substrates, solvents, and surfactants utilized as well as the method of assembling the polymerized surfactant layers thereon such that the number of layers applied can differ to a great degree as will be known to one skilled in the art.

Successive coating layers are applied until a prescribed structural surface characteristic for the multistage assembly is attained. Generally, the polymerizable surfactant is applied and assembled in alternate layers having hydrophilic and a hydrophobic surface characteristics. Each layer may also have other surface characteristics which can be altered, such as wetting, weathering, adhesion, dye adsorption, friction, electrostatic charging, permeation and biocompatibility.

The method of the invention for assembling multilayers of polymerized surfactant upon the surface of solid substrates will be illustrated by the following examples. Appreciation for the method of the invention and the multilayered surfactant coated solid material produced thereby can be gained by review of the examples and the data listed in Table I which is provided below.

EXAMPLE 1

Step A

Commercial low-density polyethylene film, 3 mils thick, (Petrothene NA 344-55; density of 0.920 g/cm$^3$; 2.0 melt index), was (1) cut into 2×10 cm pieces, (2) heated for 2 hours in refluxing 1:1 CHCl$_3$—CH$_3$OH, (3) extracted in a Soxhlet with CHCl$_3$ for 12 hours, and (4) dried [6 H, 78° C. (0.1 mm)]. The resulting strips were each placed into separate 25 mL quartz test tubes, followed by addition of 20 mL of a vesicle dispersion of the phospholipid, bis [12-(methacryloyloxy)-dodecanoyl]-L-phosphatidylcholine (I). The viscile dispersion was prepared by first dissolving 15 mg of (I) in 10 drops of CHCl$_3$ in a round-bottom flask and then coating the lipid onto the walls of the flask by evaporating off the solvent. For this, a stream of nitrogen was used initially, followed by drying under vacuum, which took 12 hours at room temperature, and 0.1 mm. Distilled water (40 mL) was then added and the mixture was hand shaken for 5 minutes, degassed with nitrogen for 10 minutes, and subject to sonication in a bath type sonicator until constant turbidity was obtained. Typically, this required about 1 hour of sonication at 55° C.

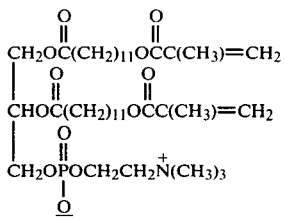

(I)

Each tube was purged with nitrogen for 10 minutes, sealed with a No-Air stopper, placed in a Rayonet photochemical reactor, and irradiated for 1 hour (2537A). The films were then removed from the tubes, gently hand shaken in air for about 15 seconds, and washed by immersing them into distilled water (about 100 mL) and gently agitating them (each film was moved in and out of the wash six or seven times). The washing procedure was repeated four times using, in each case, freshly distilled water. Finally, each strip was immersed in 1:1 $CHCl_3$—$CH_3OH$ for 24 hours at room temperature and a coated strip (PE/I) was formed.

Step b

The strip of (PE/I) was then immersed in 21 mL of 100:1 n-hexadecane—chloroform containing 2.1 mg of (I), irradiated for 1 hour (2537A under a nitrogen atmosphere), immersed in 1:1 $CHCl_3$—$CH_3OH$ for 30 minutes at room temperature, rinsed with $CH_3OH$ and dried in air for 30 minutes to form a coated strip (PE/I/I).

Step c

The film strip (PE/I/I) was then treated with an aqueous dispersion of (I) as previously described, for Step (a) to give (PE/I/I/I).

EXAMPLE 2

The procedure for Example 1 was followed except that the phospholipid (phosphatidylcholine) Compound (II) was substituted for (I).

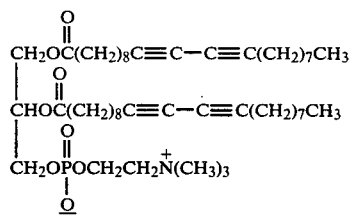

(II)

The procedure followed for this example thus produced strips of (PE/II); (PE/II/II); and (PE/II/II/II) after Step (a), (b) and (c), respectively.

Table I provides an analysis for the resultant products of Examples 1 and 2.

TABLE I

| film | Phospholipid Modified Film[a] | | |
|---|---|---|---|
| | $10^{14}$ lipids[b] per $cm^2$ | Monolayer equivalent | Stationary contact angle for water (degrees) |
| Control | | | |
| PE | — | — | 100 |
| PE/I | 2.0 | 1.0 | 55 |
| PE/I/I | 3.2 | 1.6 | 79 |
| PE/I/I/I | 5.8 | 2.9 | 43 |
| Example 2 | | | |
| PE/II | 1.5 | 1.0 | 48 |
| PE/II/II | 3.1 | 2.1 | 68 |
| PE/II/II/II | 4.9 | 3.3 | 55 |

[a]Data listed are average values for four separate preparations.
[b]Lipid content is based on the geometrical surface of PE.

Table I summarizes the loadings of phospholipids (I) and (II) on polyethylene film (PE) as determined by phosphorous analysis. The phosphorus analysis was carried out according to the procedure described at footnote 17 in Regen, S. L., Kirszensztejn, P., Singh, A., Macromolecules, 1983, Vol 16, pages 335-338, the entire disclosure of which is incorporated herein by reference. Stationary contact angles were measured for water at each stage of syntheses. If the cross-sectional area of (I) and (II) is estimated to be 70 $A^2$, the maximumm packing density of these lipids in a monolayer is $1.4 \times 10^{14}$ lipids/$cm^2$. It is presumed that the higher loadings found for PE/I and PE/II reflect the fact that the true surface area exceeds the geometrical area, i.e., the film is not perfectly flat. A "monolayer equivalent" for polymerized (I) of PE is defined as $2.0 \times 10^{14}$ lipids/$cm^2$, and $1.5 \times 10^{14}$ lipids/$cm^2$ for (II). These values are then used to judge the completeness and uniformity of subsequent layers. As shown in Table I, successive treatment of PE/I with (I) in n-hexadecane—chloroform and in water leads to an additional lipid content approximating second and third layers. While a clear alteration in hydrophilicity is observed, both the specific lipid content and the observed contact angles indicate nonuniformity within the multilayer assembly (Note that PE/I, PE/I/I, PE/II and PE/II/II/II are very hydrophilic; PE/I/I and PE/II/II are much more hydrophobic). These results, nonetheless, provide very strong support for the existence of polymerized and oriented monolayers of phosphatidylcholine attached to the surface of the PE.

EXAMPLE 3

The procedure for Example 1 may be followed except that the phosphate ester (III) is substituted for (I).

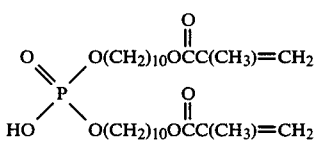

(III)

The process followed for this example will thus produce strips of (PE/III); (PE/III/III); and (PE/III/III/III) after Steps (a), (b) and (c), respectively.

EXAMPLE 4

The procedure for Example 1 may be followed except that the phosphate ester (IV) is substituted for (I).

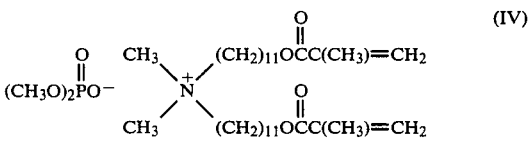

(IV)

The procedure followed for this example will thus produce strips of (PE/IV); (PE/IV/IV); and (PE/IV/IV/IV) after Steps (a), (b) and (c), respectively.

Monolayers formed following Step (a) of Examples 3 and 4, i.e., PE/III and PE/IV reached maximum loading using surfactant concentrations of 0.1 mg of (III) per mL and 0.4 mg of (IV) per mL, and were $3.6 \times 10^{14}$ and $1.3 \times 10^{14}$ lipids per cm$^2$, respectively. The maximum loadings for I and II on PE were $2.0 \times 10^{14}$ and $1.5 \times 10^{14}$ lipids per cm$^2$, respectively. Stationary contact angles for water on the surface of PE/I, PE/II, PE/III and PE/IV were 35°, 46°, 60° and 51°, respectively, indicating relatively hydrophilic surfaces; untreated PE showed a contact angle of 100°. Placement of water droplets at different locations on each film modified by I, II, III and IV indicated that the surfaces were uniformly wetted.

Comparative Example A

The procedure for Example 1 Step (a) was followed except that the phospholipid (A) was substituted for (I)

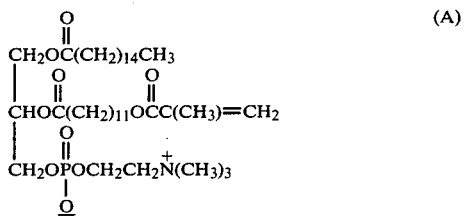
(A)

Phospholipid (A) did not form a monolayer on the polyethylene after Step (a) and failed to modify the polyethylene film as indicated by phosphorous analysis and by retention of the hydrophobic surface.

Comparative Example B

The procedure for Example Step (b) was followed except that the phospholipid (B) was substituted for (I)

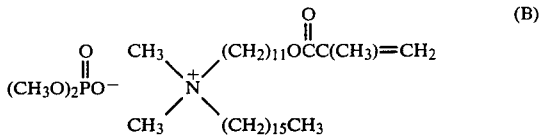
(B)

Phospholipid (B) did not form a monolayer on the polyethylene after Step (b) and failed to modify the polyethylene film as indicated by phosphorous analysis and by retention of the hydrophobic surface.

EXAMPLE 5

The procedure for Example 1 may be followed except that the phospholipid (phosphatidylcholine) compound (II) is substituted for (I) in Step (b) only.

The procedure followed for this example will thus produce strips of (PE/I); (PE/I/II); and (PE/I/II/I) for Steps (a), (b) and (b), respectively.

The scope of the present invention is not limited by the description, examples and suggested uses herein, and modifications can be made without departing from the spirit of the invention. For example, the method of the invention can be carried out in a continuous manner utilizing a continuous substrate film to which layers according to the invention are assembled thereon. Thus, it is intended that the present invention cover the modifications and variations of this invention provided they come within the scope of the appended claims and their equivalents.

The term sonicate as used herein means to expose to high frequency sound waves, i.e., at a frequency of $\geq 20000$ cps.

What is claimed is:

1. A method for the stepwise coating of a solid substrate with a polyfunctional polymerizable surfactant to provide a multilayer assembly on a surface of the solid substrate comprising depositing and polymerizing sequential layers of polymerizable surfactant on said substrate or coated substrate from a polymerization system comprising:
    (a) a polyfunctional polymerizable surfactant in an aqueous or polar solvent system; and
    (b) a polyfunctional polymerizable surfactant in nonpolar organic solvent system;
wherein the sequential coatings are alternately effected from the (a) and (b) polymerization systems and the polymerizable surfactant utilized is the same or different for each sequential coating.

2. The method of claim 1 wherein the surface of the substrate is substantially hydrophobic and the system (a) is utilized for the initial coating to form an alternate hydrophilic surface.

3. The method of claim 1 wherein the substrate is substantially hydrophilic and polymerization system (b) is utilized for the initial coating to form an alternate hydrophobic surface.

4. The method of claim 1 wherein from 3 to 5 layers are sequentially formed on a surface of the solid substrate.

5. The method of claim 1 wherein the polymerizing step comprises effecting the polymerization by irradiation.

6. The method of claim 5 wherein the irradiation is U.V. radiation.

7. The method of claim 1 wherein the polymerizing steps comprise effecting the polymerization by chemical polymerization means.

8. The method of claim 7 wherein the claimed polymerization means comprise a free radical initiating compound.

9. The method of claim 1 wherein the substrate is a solid organic polymer.

10. The method of claim 9 wherein the solid organic polymer substrate is a film.

11. The method of claim 9 wherein the substrate is a solid organic polymer selected from the group consisting of polyethylene, polypropylene, polybutylene, polystyrene, copolymers of ethylene and one or more C$_3$ to C$_8$ olefin monomers and mixtures of said polymers.

12. The method of claim 11 wherein the solid organic polymer substrate is a film.

13. The method of claim 1 wherein at least one surfactant is a phospholipid.

14. The method of claim 1 wherein at least one surfactant is selected from the group consisting of a phosphatidyl choline, a phosphate ester and an ammonium phosphate.

15. The method of claim 1 wherein at least one surfactant is a phospholipid and at least two polymerizable groups are present in separate acid moieties of said phospholipid.

16. The method of claim 1 wherein at least one surfactant is a phosphatidylcholine.

17. The method of claim 9 wherein at least one surfactant is a phosphatidylcholine.

18. The method of claim 15 wherein the phosphatidylcholine is selected from those having the formulae:

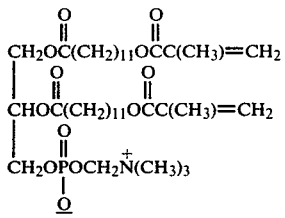

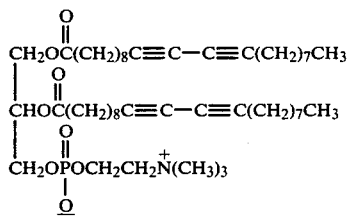

19. The method of claim 1 wherein at least one surfactant is a phosphate ester.

20. The method of claim 19 wherein the phosphate ester has the formula:

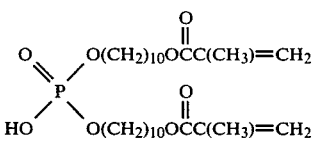

21. The method of claim 1 wherein at least one surfactant is an ammonium phosphate.

22. The method of claim 21 wherein the ammonium phosphate has the formula:

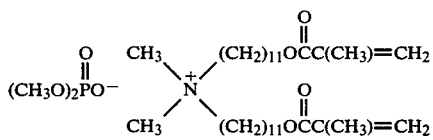

23. The method of claim 1 wherein at least one surfactant deposited on the substrate or the coated substrate is dispersed in an aqueous solvent system.

24. The method of claim 11 wherein at least one surfactant deposited on the substrate or the coated substrate is dispersed in an aqueous solvent system.

25. The method of claim 1 wherein the non-polar organic solvent system comprises a mixture of a major amount of n-hexadecane and a minor amount of chloroform.

26. The method of claim 25 wherein the n-hexadecane and chloroform solvent mixture is in a ratio of n-hexadecane to chloroform of about 100:1.

27. The method of claim 1 wherein said layers provide alternate hydrophilic and hydrophobic surface characteristics to the substrate.

28. The method of claim 1 wherein successive coating layers are applied until a prescribed structural surface characteristics for the multilayer assembly is attained.

29. The method of claim 14 wherein successive coating layers are applied until a prescribed structural surface characteristic for the multilayer assembly is attained.

30. A method for the stepwise coating of a hydrophobic solid substrate with a polyfunctional polymerizable surfactant to provide a multilayer assembly on a surface of the hydrophobic solid substrate comprising the steps of:
   (a) depositing a polyfunctional polymerizable surfactant in an aqueous solution on a surface or a coated surface of the hydrophobic solid substrate;
   (b) polymerizing the surfactant deposited in step (a) to form a coating comprising a hydrophilic layer of polymerized surfactant on the surface of the solid substrate;
   (c) depositing a polyfunctional polymerizable surfactant in a non-polar solvent systwem on the coated hydrophilic surface of the solid substrate of step (b) wherein said surfactant may be the same or different from the surfactant of step (a);
   (d) polymerizing the surfactant deposited in step (c) to form an additional coating on the substrate comprising a hydrophobic layer of polymerized surfactant on the surface of the solid substrate.

31. The method of claim 30 wherein at least one polymerizable surfactant is a phospholipid.

32. The method of claim 30 wherein the polymerizable surfactant is a phosphatidylcholine.

33. The method of claim 30 wherein the non-polar solvent system comprises a mixture of n-hexadecane and chloroform.

34. The method of claim 30 wherein the hydrophobic solid substrate is an organic polymer film.

35. A method for the stepwise coating of a solid organic polymer substrate with a polyfunctional polymerizable surfactant to provide a multilayer assembly on a surface of the polymer substrate comprising the steps of:
   (a) depositing a polymerizable surfactant in an aqueous solution on a surface of the polymer substrate;
   (b) polymerizing the surfactant deposited in step (a) to form a coating comprising a hydrophilic layer of polymerized surfactant on the surface of the polymer substrate;
   (c) depositing a polymerizable surfactant in a non-polar solvent system on the coated-hydrophilic layer of the polymer substrate of step (b);
   (d) polymerizing the surfactant deposited in step (c) to form an additional coating comprising a hydrophobic layer of polymerized surfactant on the surface of the polymer substrate;
wherein the polyfunctional surfactant used in any of sequential steps (a) or (c) is the same or different and is a polyfunctional phospholipid having at least two polymerizable groups in separate acid moieties and the solid organic polymer substrate is a polyolefin.

36. The method of claim 35 wherein the solid organic polymer substrate is in strip or film form.

37. The method of claim 35 wherein at least one polymerizing step is effected by irradiation.

38. A method for the stepwise coating of low density polyethylene film with a polyfunctional polymerizable surfactant to provide a multilayer assembly on a surface of the polymer substrate comprising the steps of:

(a) depositing a polymerizable surfactant in an aqueous solution on a surface of the polyethylene film;
(b) polymerizing the surfactant deposited in step (a) to form a coating comprising a hydrophilic layer of polymerized surfactant on the surface of the polyethylene film;
(c) depositing a polymerizable surfactant in a non-polar solvent system on the coated-hydrophilic layer of the polyethylene film of step (b);
(d) polymerizing the surfactant deposited in step (c) to form an additional coating comprising a hydrophobic layer of polymerized surfactant on the surface of the polyethylene film;

wherein the polyfunctional polymerizable surfactant used in any of sequential steps (a) or (c) is the same or different and is selected from the group consisting of:

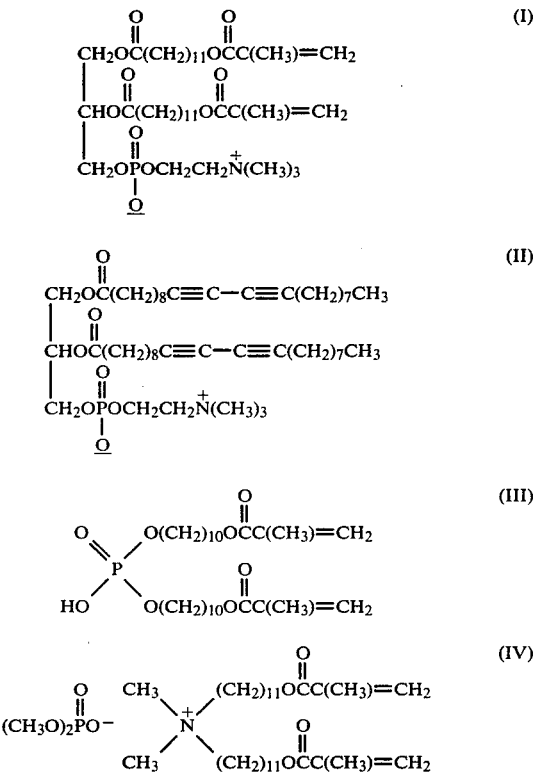

39. The method of claim 35 wherein at least one polymerizing step is effected by irradiation.
40. The multilayer surfactant coated solid substrate producted by the method of claim 1.
41. The multilayer surfactant coated solid substrate produced by the method of claim 4.
42. The multilayered surfactant coated solid material produced by the method of claim 10.
43. The multilayered surfactant coated solid material produced by the method of claim 14.
44. The multilayered surfactant coated solid material produced by the method of claim 18.
45. The multilayered surfactant coated solid material produced by the method of claim 22.
46. The multilayered surfactant coated solid material produced by the method of claim 22.
47. The multilayered surfactant coated solid material produced by the method of claim 27.
48. The multilayered surfactant coated solid material produced by the method of claim 29.
49. The multilayered surfactant coated polymer substrate produced by the method of claim 35.
50. The multilayered surfactant coated polymer substrate produced by the method of claim 38.
51. The method of claim 9 wherein the solid organic polymer is a polyolefin.
52. The method of claim 35 wherein said polyolefin is selected from the group consisting of polyethylene, polypropylene, polybutylene, polystyrene, copolymers of ethylene and one or more $C_3$ to $C_8$ olefins, and mixtures of such polymers.
53. The method of claim 1 wherein at least one surface of said solid substrate is at least partially coated with the coatings of polymerized surfactant.
54. The method of claim 1 wherein each successive coating is superimposed on the preceding coating.
55. The method of claim 1, wherein the substrate is glass.
56. The method of claim 55 wherein the substrate is silanated glass.
57. The method of claim 1 wherein the substrate is metal or graphite.
58. A multilayered surfactant coated solid substrate prepared as in claim 1 having a patterned coating of polymerized surfactant thereon.
59. A multilayered surfactant coated solid substrate as in claim 58 in which said patterned coating is in the form of a photoresist.
60. An isolated surfaced article having deposited on some or all of the isolated surfaces thereof a multilayer assembly formed from a plurality of polymerized oriented monolayers of polymerizable surfactant.
61. An isolated surfaced article as in claim 60 which is in the form of a tube.
62. An isolated surfaced article as in claim 61 which has a webbed surface.
63. An isolated surfaced article as in claim 62 which has a woven construction.
64. An isolated surfaced article as in claim 62 which has a non-woven construction.
65. An isolated surfaced article as in claim 60 which is a fine particle sized material.
66. An isolated surfaced article as in claim 60 which is porous.
67. An isolated surfaced article as in claim 60 which is a rough surfaced material.
68. An isolated surfaced article as in claim 60 having a patterned coating of polymerized surfactant thereon.
69. An isolated surfaced article as in claim 68 in which said patterned coating is in the form of a photoresist.
70. An isolated surfaced article as in claim 68 in which a patterned coating is applied to a non-linear optical element.
71. A substrate having directly deposited thereon a multilayer assembly formed from a plurality of oriented monolayers of polymerized surfactant.
72. A substrate as in claim 71 which is planar.
73. A substrate as in claim 71 which has one or more isolated surfaces.
74. A substrate as in claim 71 having a patterned coating of polymerized surfactant applied thereto.
75. A substrate as in claim 71 in which said patterned coating is in the form of a photoresist.
76. A substrate as in claim 75 in which said patterned coating is applied to a non-linear optical element.

* * * * *